United States Patent
Hahn et al.

(10) Patent No.: US 9,845,540 B2
(45) Date of Patent: Dec. 19, 2017

(54) BIPOLAR PLATE FOR AN ELECTROLYZER, ELECTROLYZER AND METHOD FOR PRODUCING A BIPOLAR PLATE

(71) Applicant: SIEMENS AKTIENGESELLSCHAFT, Munich (DE)

(72) Inventors: Alexander Hahn, Roettenbach (DE); Alexander Spies, Erlangen (DE); Jochen Straub, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 104 days.

(21) Appl. No.: 14/441,345

(22) PCT Filed: Oct. 10, 2013

(86) PCT No.: PCT/EP2013/071171
§ 371 (c)(1),
(2) Date: May 7, 2015

(87) PCT Pub. No.: WO2014/072150
PCT Pub. Date: May 15, 2014

(65) Prior Publication Data
US 2015/0259809 A1 Sep. 17, 2015

(30) Foreign Application Priority Data

Nov. 8, 2012 (EP) .................... 12191737

(51) Int. Cl.
*C25B 9/18* (2006.01)
*C21B 9/08* (2006.01)
(Continued)

(52) U.S. Cl.
CPC ............... *C25B 9/066* (2013.01); *C25B 9/04* (2013.01); *C25B 9/10* (2013.01); *C25B 11/02* (2013.01);
(Continued)

(58) Field of Classification Search
CPC .. C25B 9/206; C25B 9/20; C25B 9/18; C25B 9/04; C25B 9/08; C25B 9/00; C25B 13/00; C02F 2001/46128
(Continued)

(56) References Cited

U.S. PATENT DOCUMENTS 4,758,322 A 7/1988 Sioli
5,482,792 A * 1/1996 Faita ..................... C25B 9/10
429/437

(Continued)

FOREIGN PATENT DOCUMENTS

DE 10025207 A1 11/2001
EP 2065958 A1 6/2009
(Continued)

*Primary Examiner* — Zulmariam Mendez
(74) *Attorney, Agent, or Firm* — Laurence Greenberg; Werner Stemer; Ralph Locher

(57) ABSTRACT

A bipolar plate for an electrolyzer, particularly a PEM electrolyzer, is formed with a central region and a peripheral region surrounding the central region. With a view to cost-effective production of the bipolar plate, the central region is made of metal sheet and the peripheral region is formed from a plastic frame. The plastic frame is made of at least one thermoplastic, particularly at least one high-temperature thermoplastic, and is injection-molded around the sheet metal.

11 Claims, 1 Drawing Sheet

(51) Int. Cl.
*C25B 9/00* (2006.01)
*C25B 13/00* (2006.01)
*C25B 9/06* (2006.01)
*C25B 9/04* (2006.01)
*C25B 9/10* (2006.01)
*H01M 8/0206* (2016.01)
*H01M 8/0221* (2016.01)
*H01M 8/0273* (2016.01)
*C25B 11/02* (2006.01)

(52) U.S. Cl.
CPC ....... *H01M 8/0206* (2013.01); *H01M 8/0221* (2013.01); *H01M 8/0273* (2013.01); *Y02E 60/366* (2013.01); *Y02P 70/56* (2015.11)

(58) Field of Classification Search
USPC ........................................................ 204/255
See application file for complete search history.

(56) References Cited

U.S. PATENT DOCUMENTS

| | | | |
|---|---|---|---|
| 6,426,160 | B1 | 7/2002 | Hagino et al. |
| 6,852,205 | B1* | 2/2005 | Toyoshima ............... C25B 9/20 204/253 |
| 2003/0143451 | A1 | 7/2003 | Andou et al. |
| 2011/0033767 | A1 | 2/2011 | Liotta et al. |

FOREIGN PATENT DOCUMENTS

| | | |
|---|---|---|
| EP | 2141264 A1 | 1/2010 |
| EP | 2201157 A1 | 6/2010 |
| JP | S62161974 A | 7/1987 |
| JP | H1121685 A | 1/1999 |
| JP | 2000277132 A | 10/2000 |
| JP | 2001164391 A | 6/2001 |
| WO | 9750139 A1 | 12/1997 |
| WO | 2009033648 A1 | 3/2009 |

* cited by examiner

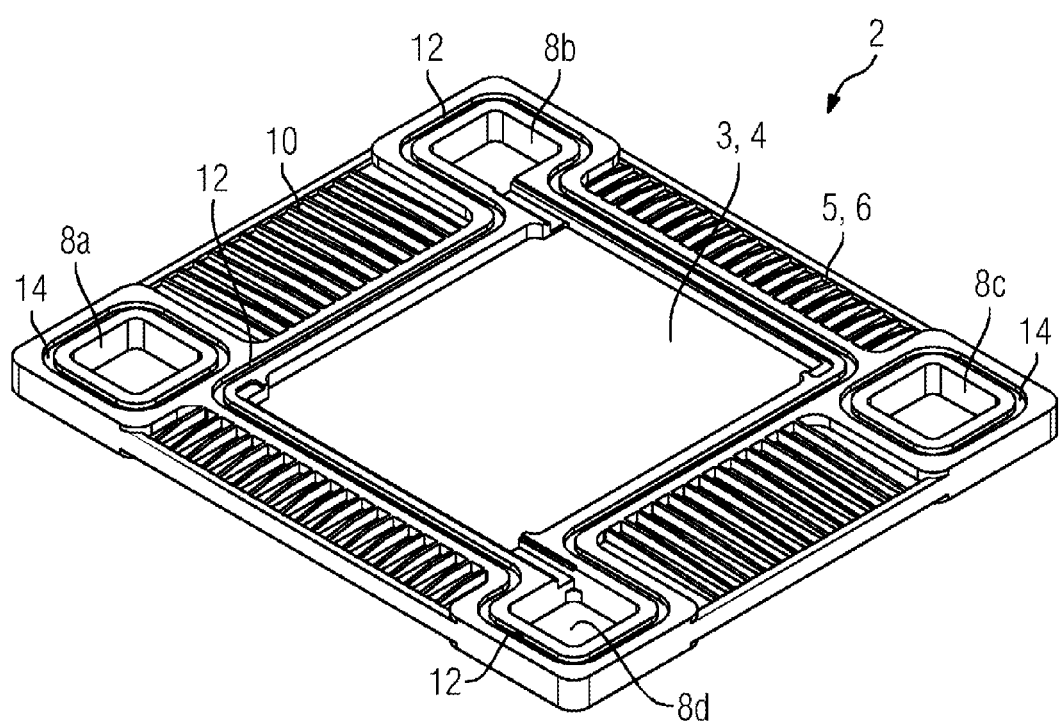

BIPOLAR PLATE FOR AN ELECTROLYZER, ELECTROLYZER AND METHOD FOR PRODUCING A BIPOLAR PLATE

BACKGROUND OF THE INVENTION

Field of the Invention

The invention relates to a bipolar plate for an electrolyzer, especially a PEM electrolyzer, comprising a central region and a peripheral region surrounding the central region. The invention further relates to an electrolyzer, especially to a PEM electrolyzer, comprising at least one such bipolar plate. The invention additionally relates to a method for producing such a bipolar plate.

Electrochemical cells are generally known and are divided into galvanic cells and electrolysis cells. An electrolysis cell is an apparatus in which an electrical current forces a chemical reaction, wherein at least a part of the electrical energy is converted into chemical energy. A galvanic cell is an apparatus—complementary to the electrolysis cell—for spontaneous conversion of chemical energy into electrical energy. A known apparatus of such a galvanic cell is a fuel cell for example.

The splitting of water by electrical current for production of hydrogen and oxygen gas by means of an electrolysis cell is widely known. A distinction is made primarily between two technical systems in this case, alkaline electrolysis and PEM (Proton-Exchange-Membrane) electrolysis.

At the heart of a technical electrolysis system is the electrolysis cell comprising two electrodes and one electrolyte. In a PEM electrolysis cell the electrolyte consists of a proton-conducting membrane on both sides of which the electrodes are located. The unit consisting of membrane and electrodes is known as an MEA (Membrane-Electrode-Assembly). In the assembled state of an electrolysis stack consisting of a number of electrolysis cells the electrodes are contacted via a gas diffusion layer by so-called bipolar plates, wherein the bipolar plates separate the individual electrolysis cells of the stacks from one another. In this case the $O_2$ side of the electrolysis cell corresponds to the plus pole and the $H_2$ side the minus pole, separated by the membrane electrode assembly lying between them.

The PEM electrolysis cell is fed on the $O_2$ side with fully desalinated water, which breaks down at the anode into hydrogen gas and protons (H*). The protons migrate through the electrolyte membrane and recombine on the $H_2$ side to form hydrogen gas. In this process the gas diffusion layer in contact with the electrodes guarantees the optimum water distribution (and thus the wetting of the membrane) as well as to transport the product gases away.

In principle the electrolysis cells can be operated pressurized or unpressurised. An additional internal pressure has advantages in subsequent storage of the product gases and has practically no adverse effect on the level of efficiency of the electrolysis cell.

An important task in the construction of the described electrolysis cells consists of selecting the materials used for the bipolar plate. The operating conditions make high demands in terms of corrosion protection on the materials employed. In addition to the high operating temperature of up to 120° C. and pressures within the electrolysis cells of up to 50 bar, the materials of the bipolar plate are subjected on the $H_2$ side to heavily reducing conditions and on the $O_2$ side to heavily oxidizing conditions, in addition they are at negative or positive electrical potentials in such cases. On the other hand the bipolar plates have direct contact with the membrane outside the electrodes or the assigned gas diffusion layer. Because of the strongly acidic surface of the membrane (sulfonated Teflon polymers, e.g. Nafion) outside the electrodes or the assigned gas diffusion, this is a further challenge in respect of corrosion resistance. The bipolar plates which are currently used are generally therefore made of titanium or stainless steel. Mostly this involves massive pressed parts or plates drawn from the aforementioned materials. Pure titanium is mostly used on the positive side ($O_2$ side) because of the marked passivization region. However even pure titanium is not stable and corrodes without an appropriate coating on the negative side ($H_2$ side).

In addition to the challenging usage conditions, subsequent installation of the electrolysis stack makes high demands on the dimensional accuracy of the bipolar plates. To make a reliable seal in a stack consisting of over 100 individual cells only very small production tolerances on the bipolar plates are permissible.

The result is that, because of the corrosive requirements, very cost-intensive materials (pure titanium, high quality stainless steel) are employed and because of the small production tolerances, very expensive production methods (often massive milled plates) are employed. In addition to the membrane electrode assembly they thus represent the greatest cost factor in an electrolysis stack.

A bipolar plate for a PEM electrolyzer is known from patent EP 2 201 157 B1, which has a central region and a peripheral region surrounding the central region. Both the central region and also the peripheral region are embodied from plastic. The central region has a flow field consisting of a number of flow channels. The central region is embodied either from a conductive polymer or from a non-conductive plastic which represents a base material in which conductive elements are embedded in the manner of contact pins or plates running in a trapezoidal shape. The integration of separate conductive elements in the central region makes the production of such a bipolar plate complicated and correspondingly expensive. In addition the bipolar plates need an additional current distributor the size of the electrodes in order to evenly contact the entire electrode surface.

BRIEF SUMMARY OF THE INVENTION

The underlying object of the invention is to specify a bipolar plate which meets corrosion requirements and in meeting said requirements is simple and low-cost to produce.

The object is achieved in accordance with the invention by a bipolar plate for an electrolyzer, especially a PEM electrolyzer, comprising a central region and also a peripheral region surrounding the central region, wherein the central region consists of a metal plate and the peripheral region is formed by a plastic frame, wherein the plastic frame is embodied from a least one thermoplastic, especially from a least one high-temperature thermoplastic and is injection-molded around the metal plate.

The object is further achieved in accordance with the invention by an electrolyzer, especially a PEM electrolyzer, comprising at least one such bipolar plate.

The object is further achieved in accordance with the invention by a method for producing such a bipolar plate, in which the metal plate is produced and the plastic frame is injection-molded around the metal plate.

Invention is based on the idea that, because of the different functions of the central region and the peripheral region of the bipolar plate, these regions can consist of separate components which are only joined together in the production of the bipolar plate. Since the different regions of the bipolar plates are initially separate components, different materials, which are best suited to fulfilling the function of this region, are also chosen for the respective region.

Thus the central area is formed from a single, especially flat metal sheet, which best guarantees the electrical conductivity of the central region and in addition is very simple to produce.

The peripheral region for its part is especially an electrically non-conductive injection-molded part made of plastic. The injection molding process for the production of the plastic frame has significant advantages in respect of the molding of the plastic frame (for example the making of holes or grooves) is much more flexible and above all, in the high volume field, is markedly lower-cost than conventional metal processing methods.

The sheet is especially a rectangular plate with a thickness of a few millimeters, e.g. 1 to 2 mm, of which the surface which comes into contact with the membrane electrode assembly does not have a profile structure. In this case the flow field is especially realized by conductive, profiled insert parts. The profiled insert parts represent both the channel structure and also the gas diffusion layer, so that through this combination no additional current distributor is necessary.

The plastic frame in this case is injection-molded around the sheet. Initially the finished sheet is available and it is included for the production of the plastic frame. With the production of the plastic frame the sheet and the plastic frame are especially connected non-releasably to one another, so that the central region and the peripheral region of the finished bipolar plate form a single, inseparable unit. This embodiment of the bipolar plate is characterized by very few production steps being required.

In order to meet the high demands for corrosion and temperature resistance, the plastic frame preferably contains at least one thermoplastic, especially at least one hi-temperature thermoplastic such as for example polyetheretherketone (PEEK), polyphenylene sulfide (PPS), polysulfone (PSU), polyether sulfone (PES), polyetherimide (PEI), aromatic polyamide (PA6/6T), etc.

A significant difference between the bipolar plates described above compared to the bipolar plate according to EP 2 201 157 B1 is that the central region, which is electrically conductive, is embodied entirely of metal and does not feature any plastic. The metal sheet can thus be designed in simple geometries, such as a rectangular plate for example. By contrast with the plastic bipolar plate from the prior art, the plastic frame of the bipolar plate described above is a separate component, so that the metal sheet is produced independently from the production of the plastic frame.

Preferably distribution channels for operating media are only integrated into the plastic frame. Distribution channels here are to be understood as inlets and outlets for the operating media water, oxygen and hydrogen. In particular the complete periphery of the electrolysis stack, e.g. comprising the water supply channels along the electrolysis stack and the inlets to the individual cells, as well as sealing elements, are integrated into the plastic frame. This is especially advantageous in respect of simple molding of the plastic frame. Since the entire profile structure of the bipolar plate is embodied in the area of the plastic frame, the metal sheet can have an especially simple shape, in particular no cutouts are provided for the distribution channels and also no further profile elements are provided in the metal sheet— the sheet is flat and has a smooth surface. The advantages of the injection-molding process as a molding method apply in this case both for a directly surround-molded sheet and also for the separate injection molding of two half shells into which the sheet is inserted.

In accordance with a preferred embodiment at least one groove for insertion of the seal is provided in the plastic frame. Expediently the groove extends at least around the central region. As an alternative the central region and at least one or more of the distribution channels is sealed by a single comprehensive seal which is inserted into the correspondingly molded groove. As an alternative the distribution channels are sealed separately.

As an alternative or in addition a seal is preferably molded onto the plastic frame, so that the seal is an integral component of the plastic frame. With today's injection technologies it is possible to produce the plastic frame and the seals integrated therein from a different materials in just one stage. The time for producing the entire bipolar plate is thus shortened. In particular a more elastic plastic is provided here for the seal by comparison with the rest of the frame.

In accordance with a preferred embodiment the plastic frame contains a number of types of plastic. The individual areas of the plastic frame, depending on material requirements, can be constructed from different polymers (multi-component injection-molded sandwich structure). For example areas which are in direct contact with the membrane electrode unit can be designed from very robust PEEK or PPS and other parts of the plastic frame not stressed so greatly mechanically are molded from lower-cost plastics.

For construction and stability reasons the plastic frame preferably has rib elements, which in particular is embodied in the surface between the distribution channels.

The metal plate is expediently embodied from titanium and/or stainless steel.

Through the use of a plastic frame the corrosion problem of the bipolar plates is minimized. The metal parts of the bipolar plate do not have any direct contact with the membrane and are not subjected to the heavily acid surface. The membrane is merely in contact with the plastic frame. For this reason plastics with sufficient resistance to chemicals (for example PEEK, PPS) are selected for the plastic frame.

BRIEF DESCRIPTION OF THE DRAWING

The single FIGURE of the drawing shows a bipolar plate for an electrolysis cell.

DESCRIPTION OF THE INVENTION

An exemplary embodiment of the invention is explained in greater detail with reference to a drawing. Here the single figure shows a bipolar plate 2 for an electrolysis cell of a PEM electrolyzer not shown in any greater detail. The bipolar plate 2 comprises a central region 3 made from a metallic sheet 4, as well as a peripheral region 5, which is formed by a plastic frame 6. In the exemplary embodiment shown the bipolar plate 2 has been produced by molding the plastic frame 6 around the completed metal plate 4 and in this way a non-releasable connection between the metal plate 4 and the plastic frame 6 has been created.

The central area 3 is defined by this area not being in any direct contact with the membrane of the membrane-electrode-assembly during operation. The peripheral region is the area of the bipolar plate 2 which surrounds the central region and in parts is in direct contact with a polymer electrolyte membrane (PEM).

The metal sheet 4 is a flat sheet consisting exclusively of titanium or stainless steel, having a smooth, flat surface on both sides. The metal sheet 4 has a thickness in the order of a few millimeters, especially 1 to 2 mm. The size of the metal sheet 4 essentially corresponds to the size of the active electrode surface of a membrane-electrode assembly not shown in any greater detail here. The size of the metal sheet 4 is selected so that, in the assembled state of the electrolysis cell, the metal sheet 4 merely contacts one of the electrodes indirectly via a gas diffusion layer 4. In the assembled state of the electrolysis cell or of the PEM electrolyzer there is no direct contact between the metal sheet 4 and the heavily acid surface of the membrane.

In the assembled state of the PEM electrolyzer the bipolar plate 2 shown in the figure can be supplemented by additional contact, distribution, support and/or reinforcement elements in order to make possible a stable construction and trouble-free operation of the electrolyzer.

By contrast with the metallic plate 4 the plastic frame 6 has a heavily-profiled surface. In the corners of the plastic frame 6 distribution channels 8a, 8b, 8c and 8d are provided for supply of water and removal of the oxygen and hydrogen gases generated in the electrolysis cell. A number of rib elements are provided between the distribution channels 8a, 8b, 8c and 8d to achieve a greater rigidity and firmness. In addition a groove 12 is provided around the central region for receiving an insert seal. In the exemplary embodiment shown the groove 12 (with brief interruptions) also runs around the distribution channels 8b, 8d, so that the metal sheet 4 as well as the distribution channels 8b and 8d are sealed by a single ring-shaped seal. Separate groups 14 are provided around the distribution channels 8a, 8c, so that the seals which are inserted into these grooves 14 merely seal the respective distribution channel 8a, 8c. As an alternative a central seal extends around the central region and the distribution channels 8a, 8b, 8c, 8d are sealed individually.

The plastic frame 6 is embodied from at least one thermoplastic, especially from a high temperature thermoplastic, such as e.g. PEEK or PPS. Depending on the requirements imposed on the different functional areas of plastic frame 6, said area can also be embodied from different plastics. The functional areas which are imposed to a high mechanical stress, e.g. the distribution channels 8a, 8b, 8c and 8d, can also be reinforced by additional elements, e.g. insert elements made of metal or plastic.

The bipolar plate 2 described above is primarily characterized by its low-cost production. Only the flat metal plate 4 is produced from the expensive material titanium or stainless steel. The rest of the bipolar plate 2 is made of low-cost plastic. Since the production method of the plastic frame 6 allows great freedom in relation to the molding of the plastic frame 6, the bipolar plate 2 shown is thus able to be produced simply and in few stages.

The invention claimed is:

1. A bipolar plate for an electrolyzer, the bipolar plate comprising:
    a central region formed of a metallic sheet; and
    a peripheral region surrounding said central region, said peripheral region being a plastic frame formed of a thermoplastic molded around said metallic sheet;
    said plastic frame having distribution channels formed therein and a plurality of rib elements between said distribution channels, said rib elements being configured and formed on said plastic frame for enhancing a rigidity and a strength of said plastic frame, said plastic frame having an outermost rim forming a peripheral boundary of the bipolar plate and said ribs extending perpendicularly outward from said central region between said central region and said outermost rim.

2. The bipolar plate according to claim 1, configured specifically for a PEM electrolyzer.

3. The bipolar plate according to claim 1, wherein said plastic frame is formed of at least one thermoplastic selected from the group consisting of polyetheretherketone (PEEK), polyphenylene sulfide (PPS), polysulfone (PSU), polyether sulfone (PES), polyetherimide (PEI), and aromatic polyamide (PA6/6T).

4. The bipolar plate according to claim 1, wherein said distribution channels for operating media are integrated only into said plastic frame.

5. The bipolar plate according to claim 1, wherein said plastic frame is formed with at least one groove for insertion of a seal between said central region and said ribs.

6. The bipolar plate according to claim 1, which comprises a seal molded onto said plastic frame between said central region and said ribs.

7. The bipolar plate according to claim 1, wherein said plastic frame consists of a plurality of different types of plastic.

8. The bipolar plate according to claim 1, wherein said plate is formed of a metal selected from the group consisting of titanium, stainless steel, and combinations thereof.

9. An electrolyzer, comprising at least one bipolar plate according to claim 1.

10. The electrolyzer according to claim 9, configured as a PEM electrolyzer.

11. A method of producing a bipolar plate, the method which comprises producing a metallic plate and molding a plastic frame around the plate, to thereby form the bipolar plate according to claim 1.

* * * * *